United States Patent
Hunukumbure et al.

(10) Patent No.: US 11,552,754 B2
(45) Date of Patent: Jan. 10, 2023

(54) METHOD AND APPARATUS FOR PHASE TRACKING REFERENCE SIGNAL IN A WIRELESS COMMUNICATION SYSTEM

(71) Applicant: Samsung Electronics Co., Ltd, Suwon-si (KR)

(72) Inventors: Mythri Hunukumbure, Middlesex (GB); Yinan Qi, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/611,211

(22) PCT Filed: May 4, 2018

(86) PCT No.: PCT/KR2018/005170
§ 371 (c)(1),
(2) Date: Nov. 5, 2019

(87) PCT Pub. No.: WO2018/203695
PCT Pub. Date: Nov. 8, 2018

(65) Prior Publication Data
US 2020/0083996 A1    Mar. 12, 2020

(30) Foreign Application Priority Data

May 5, 2017   (GB) ..................... 1707257

(51) Int. Cl.
*H04L 5/00*     (2006.01)
*H04W 72/04*   (2009.01)

(52) U.S. Cl.
CPC ....... *H04L 5/0035* (2013.01); *H04W 72/0453* (2013.01)

(58) Field of Classification Search
None
See application file for complete search history.

(56) References Cited

U.S. PATENT DOCUMENTS

| 7,999,622 B2 | 8/2011 | Galton et al. |
| 8,743,813 B2 | 6/2014 | Liu et al. |
(Continued)

FOREIGN PATENT DOCUMENTS

| CN | 101449502 A | 6/2009 |
| EP | 1341355 A2 | 9/2003 |
(Continued)

OTHER PUBLICATIONS

Zte et al., "Discussion on RS for phase tracking", 3GPP TSG RAN WG1 NR Ad-Hoc Meeting, Jan. 16-20, 2017, R1-1700138, 11 pages.
(Continued)

*Primary Examiner* — Jamaal Henson
*Assistant Examiner* — Keith Follansbee

(57) ABSTRACT

The present disclosure relates to a pre-$5^{th}$-Generation (5G) or 5G communication system to be provided for supporting higher data rates Beyond 4th-Generation (4G) communication system such as Long Term Evolution (LTE). Described is a method for providing a Phase Tracking Reference Signal (PTRS) in a wireless communication system comprising at least a first base station and a second base station, and a mobile device. The first and second base stations cooperate to jointly support the mobile device. The method comprises identifying at least two mutually exclusive sets of frequency resources. The method further comprises mapping, by the first base station, at least a portion of PTRS information of the first base station to a first set of the frequency resources, mapping, by the first base station, a zero-power PTRS to a second set of the frequency resources, or leaving, by the first base station, the second set of frequency resources empty, and transmitting, by the first base station, a signal comprising the PTRS information of the first base station according to the frequency resource mapping. The method further (Continued)

comprises mapping, by the second base station, at least a portion of PTRS information of the second base station to the second set of the frequency resources, mapping, by the second base station, a zero-power PTRS to the first set of the frequency resources, or leaving, by the second base station, the first set of frequency resources empty, and transmitting, by the second base station, a signal comprising the PTRS information of the second base station according to the frequency resource mapping.

15 Claims, 10 Drawing Sheets

(56) References Cited

U.S. PATENT DOCUMENTS

| | | | |
|---|---|---|---|
| 8,902,842 | B1 | 12/2014 | Gomadam et al. |
| 8,923,203 | B2* | 12/2014 | Fong .................... H04J 11/0053 |
| | | | 370/328 |
| 9,270,347 | B2 | 2/2016 | Fong et al. |
| 2013/0194943 | A1 | 8/2013 | Davydov et al. |
| 2013/0259174 | A1 | 10/2013 | Qian et al. |
| 2014/0233466 | A1 | 8/2014 | Pourahmadi et al. |
| 2018/0206249 | A1* | 7/2018 | Hu .................... H04W 72/0446 |
| 2019/0165910 | A1* | 5/2019 | Lee .................... H04L 5/0051 |
| 2020/0022172 | A1* | 1/2020 | Sun .................... H04L 25/02 |
| 2020/0052930 | A1* | 2/2020 | Kim .................... H04L 27/2613 |

FOREIGN PATENT DOCUMENTS

| | | |
|---|---|---|
| EP | 2627139 A1 | 8/2013 |
| EP | 2843983 A1 | 3/2015 |
| EP | 2890032 A1 | 7/2015 |
| GB | 2562462 A | 11/2018 |
| WO | 2010/038937 A1 | 4/2010 |
| WO | 2011/100672 A1 | 8/2011 |
| WO | 2018/171783 A1 | 9/2018 |

OTHER PUBLICATIONS

Samsung, "On DL PT-RS design", 3GPP TSG RAN WG1 #89, May 15-19, 2017, R1-1707976, 5 pages.
Supplementary European Search Report dated Feb. 25, 2020 in connection with European Patent Application No. 18 79 3972, 11 pages.
Office Action dated Dec. 19, 2019 in connection with United Kingdom Patent Application No. GB1707257.0, 7 pages.
MCC Support, "Final Report of 3GPP TSG RAN WG1 #89 v1.0.0 (Hangzhou, China, May 15-19, 2017)", 3GPP TSG RAN WG1 Meeting #90, Aug. 21-25, 2017, R1-1712031, 164 pages.
Intel et al., "Joint WF on PTRS", 7 pages.
MCC Support, "Final Report of 3GPP TSG RAN WG1 #AH_NR2 v1.0.0 (Qingdao, China, Jun. 27-30, 2017)", 3GPP TSG RAN WG1 Meeting #90, R1-1712032, 109 pages.
"3rd Generation Partnership Project; Technical Specification Group Radio Access Network; Study on New Radio (NR) access technology (Release 15)", 3GPP TR 38.912 V15.0.0 (Jun. 2018), 74 pages.
InterDigital Communications, "PT-RS performance evaluation with different time domain densities", 3GPP TSG RAN WG1 AH_NR Meeting, Jan. 16-20, 2017, R1-1700857, 8 pages.
Ericsson, "SRS Design on DL and UL phase noise tracking RS (PTRS)", 3GPP TSG-RAN WG1 #87 ah-NR, Jan. 16-20, 2017, R1-1701161, 9 pages.
Panasonic, "Discussion on PT-RS for DL", 3GPP TSG RAN WG1 Meeting #88, Feb. 13-17, 2017, R1-1702297, 4 pages.
Samsung, "PT-RS design", 3GPP TSG RAN WG1 #88, Feb. 13-17, 2017, R1-1702959, 6 pages.
CMCC, "Phase-Tracking Reference Signal Design for High-Frequency Systems", 3GPP TSG RAN WG1 Meeting #88, Feb. 13-17, 2017, R1-1703406, 11 pages.
Samsung, "Discussion on UL DMRS design for NR", 3GPP TSG RAN WG1 Meeting #88bis, Apr. 3-7, 2017, R1-1705354, 3 pages.
Samsung, "DL PT-RS design", 3GPP TSG RAN WG1 #88bis, Apr. 3-7, 2017, R1-1705355, 7 pages.
Samsung, "Discussion on UL PT-RS", 3GPP TSG RAN WG1 #88bis, R1-1705356, 2 pages.
Ericsson, "On DL DMRS design", 3GPP TSG-RAN WG1 #88bis, Apr. 3-7, 2017, R1-1705902, 4 pages.
Ericsson et al., "Merged WF on PTRS structure", 3GPP TSG RAN WG1 Meeting #88bis, R1-1706676, 2 pages.
Samsung, "On DL PT-RS design", 3GPP TSG RAN WG1 NR Ad-hoc#2, Jun. 27-30, 2017, R1-1710686, 6 pages.
NTT Docomo, Inc., "New WID on New Radio Access Technology", 3GPP TSG RAN Meeting #75, Mar. 6-9, 2017, RP-170847, 8 pages.
Combined Search and Examination Report under Sections 17 and 18(3) dated May 7, 2019 in connection with United Kingdom Patent Application No. GB 1707257.0, 10 pages.
International Search Report dated Aug. 10, 2018 in connection with International Patent Application No. PCT/KR2018/005170, 3 pages.
Written Opinion of the International Searching Authority dated Aug. 10, 2018 in connection with International Patent Application No. PCT/KR2018/005170, 5 pages.
Communication pursuant to Article 94(3)EPC dated Nov. 12, 2020 in connection with European Patent Application No. 18 793 972.3, 9 pages.
The First Office Action dated Dec. 15, 2021, in connection with Chinese Application No. 201880029842.6, 19 pages.
Examination Report dated Feb. 25, 2022, in connection with Indian Application No. 201927048798, 7 pages.
European Patent Office, "Communication pursuant to Article 94(3) EPC," dated Oct. 26, 2022, in connection with European Patent Application No. EP18793972.3, 9 pages.

* cited by examiner

[Fig. 1]
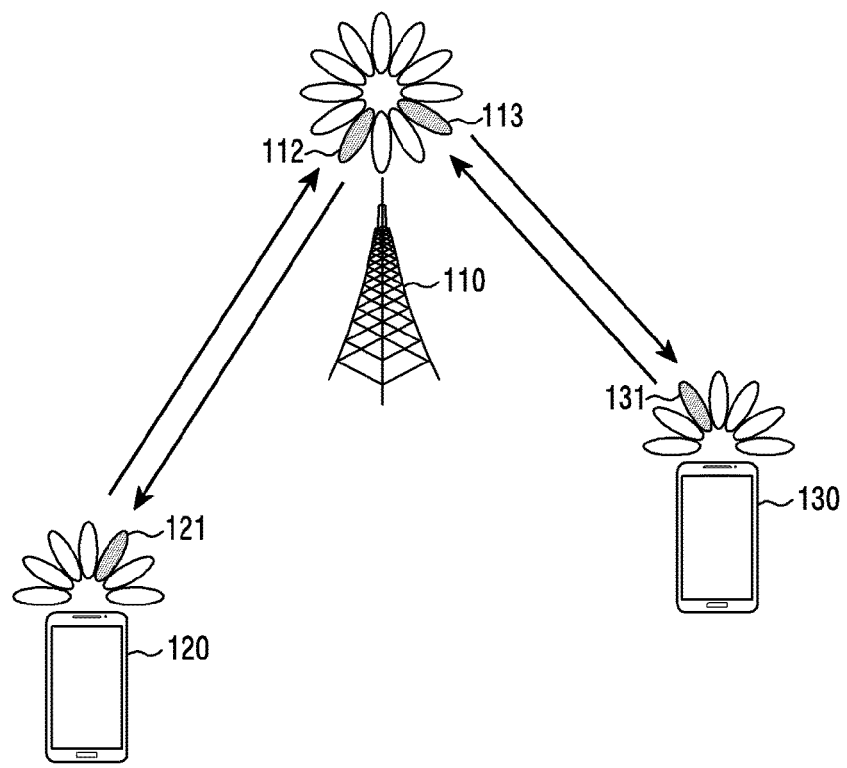
[Fig. 2]
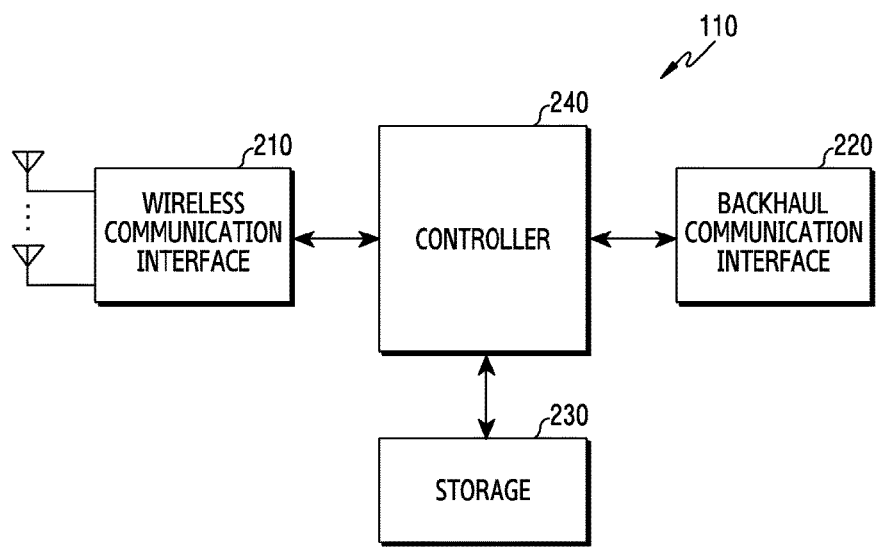

[Fig. 3]
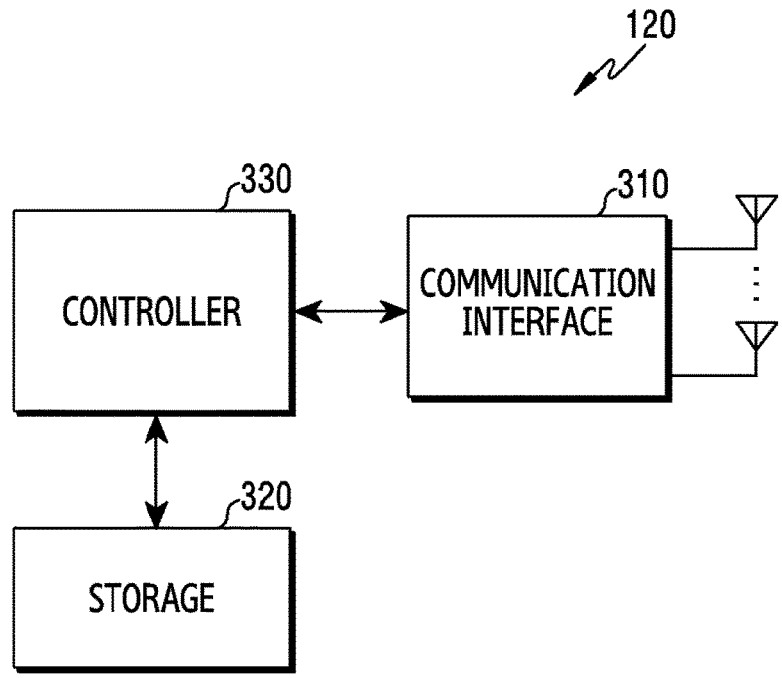
[Fig. 4]
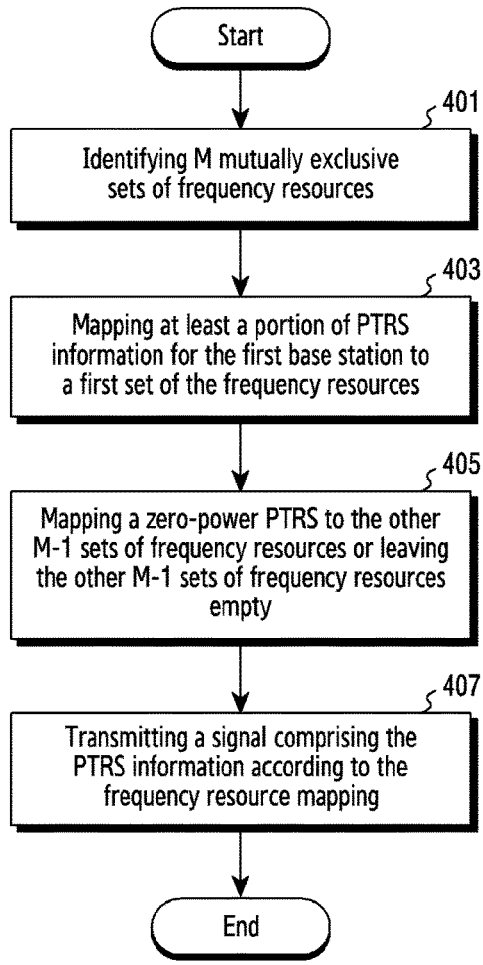

[Fig. 5]
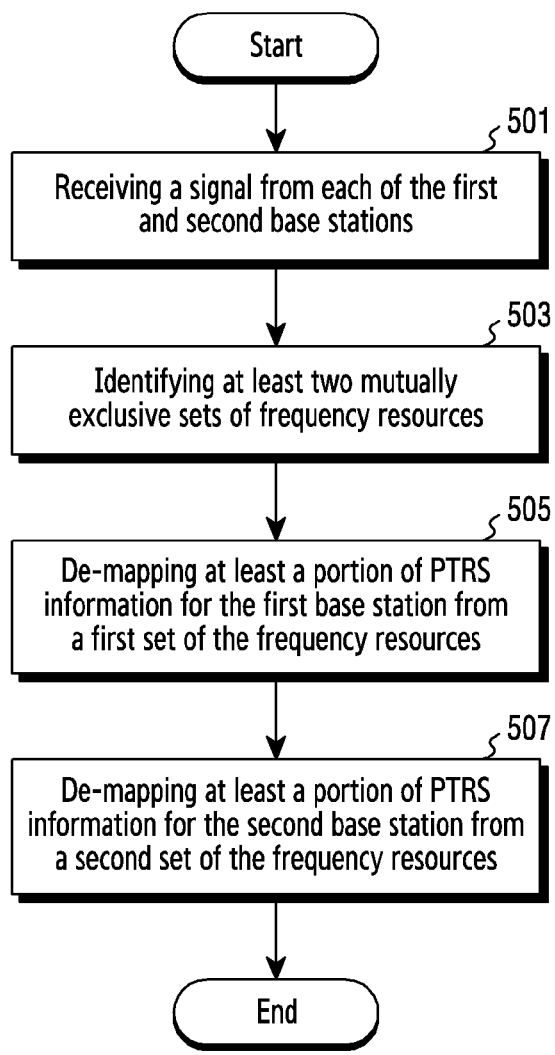

[Fig. 6]
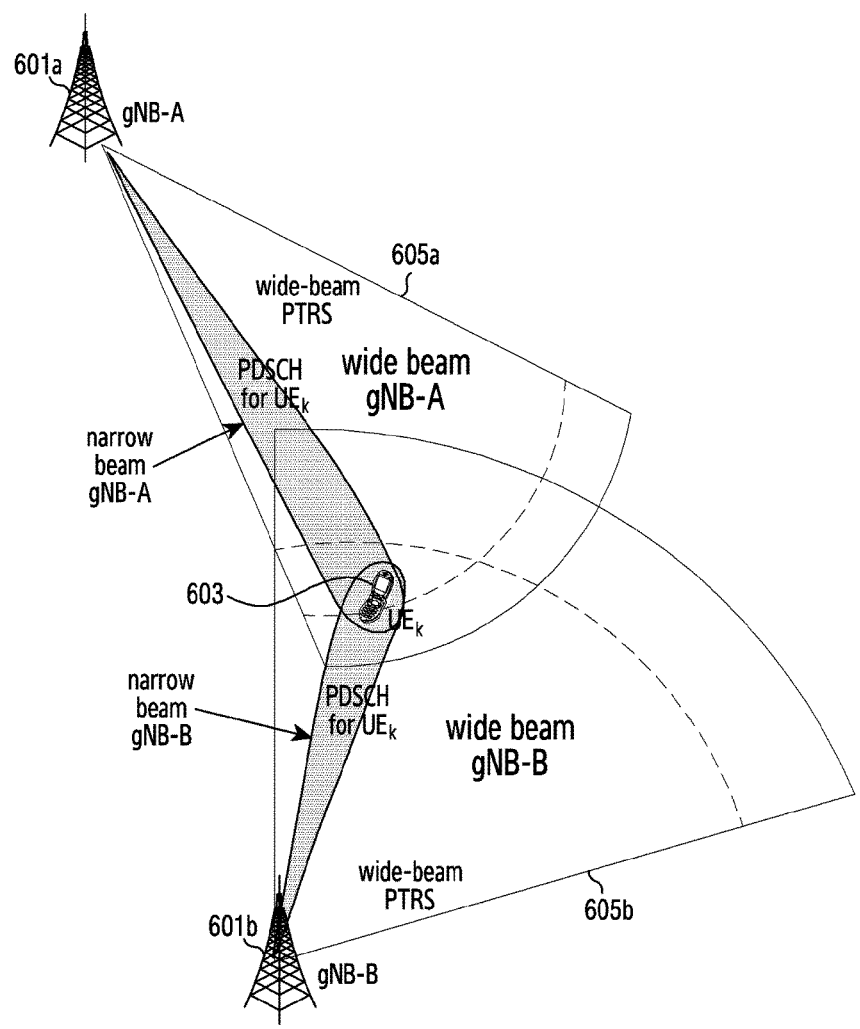

[Fig. 7A]
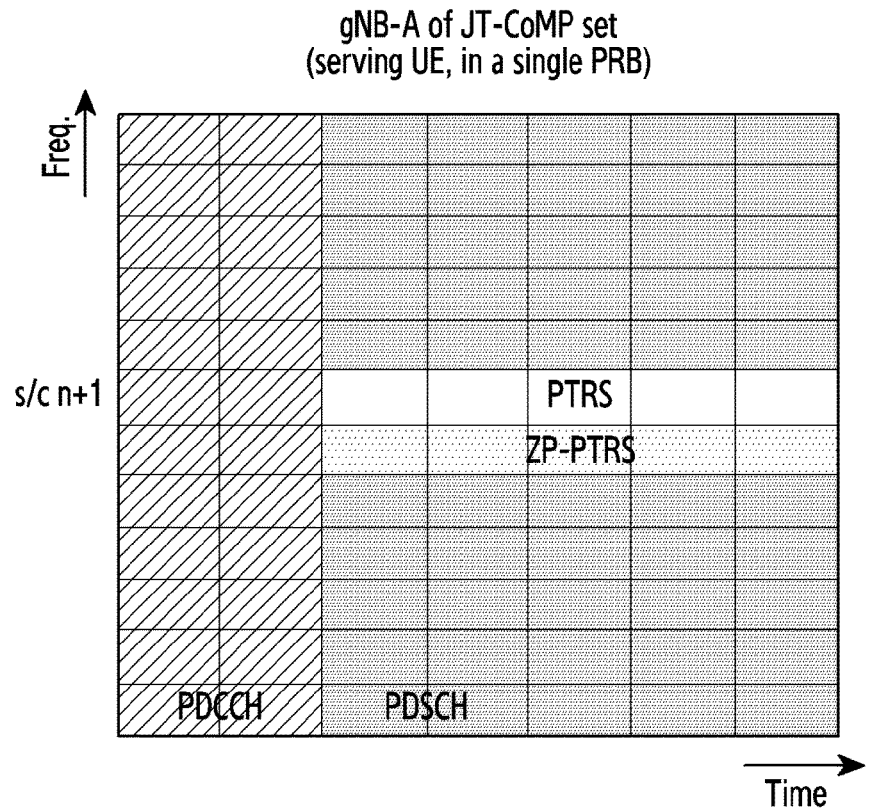
[Fig. 7B]
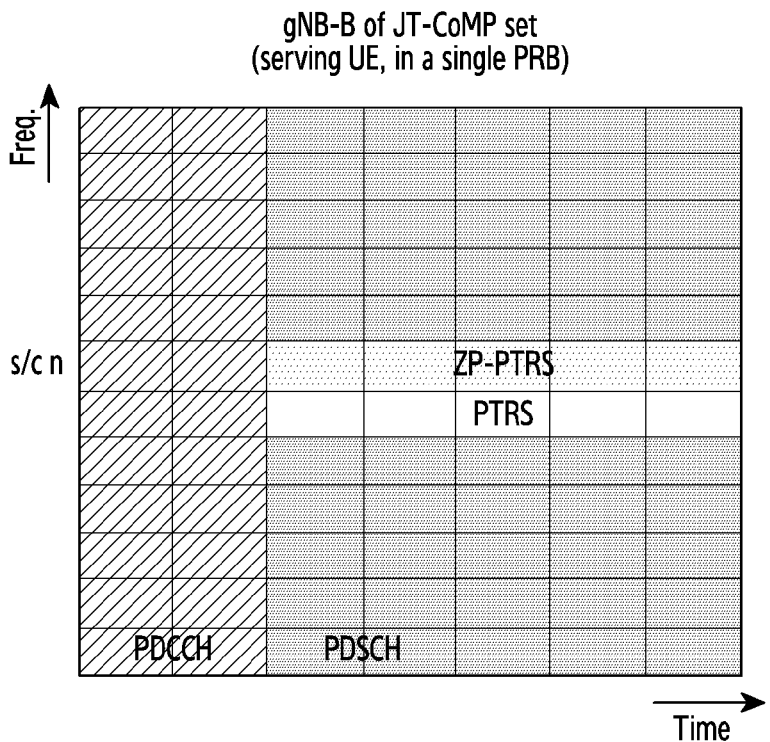

[Fig. 8A]
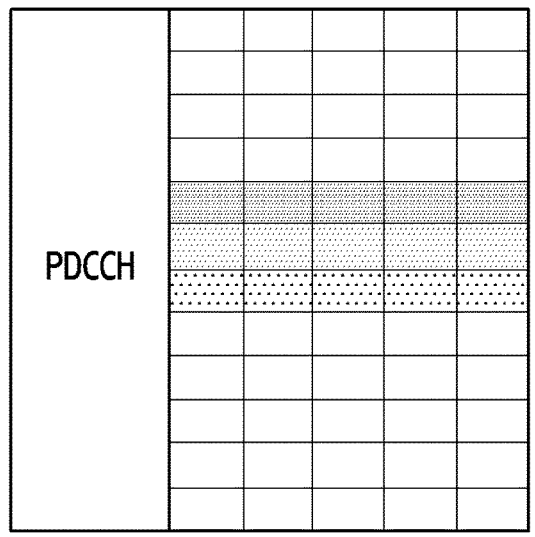
▨ PTRS for gNB 1 in frame transmitted by gNB 1
or ZP-PTRS in frames transmitted by g NB 2 and gNB 3
▨ PTRS for gNB 2 in frame transmitted by gNB 2
or ZP-PTRS in frames transmitted by g NB 1 and gNB 3
▨ PTRS for gNB 3 in frame transmitted by gNB 3
or ZP-PTRS in frames transmitted by g NB 1 and gNB 2

[Fig. 8B]
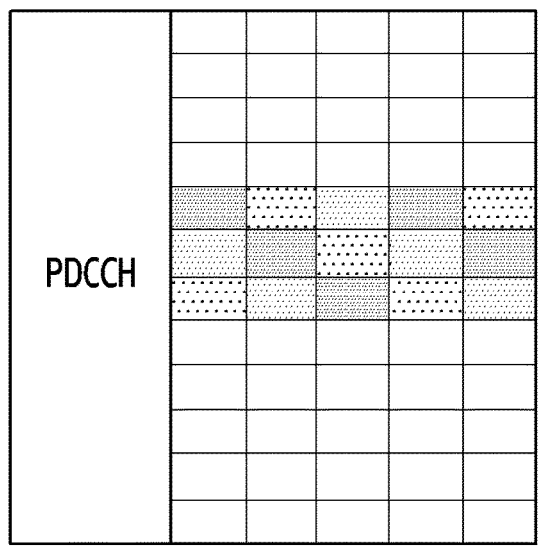
▨ PTRS for gNB 1 in frame transmitted by gNB 1
or ZP-PTRS in frames transmitted by g NB 2 and gNB 3
▨ PTRS for gNB 2 in frame transmitted by gNB 2
or ZP-PTRS in frames transmitted by g NB 1 and gNB 3
▨ PTRS for gNB 3 in frame transmitted by gNB 3
or ZP-PTRS in frames transmitted by g NB 1 and gNB 2

[Fig. 8C]
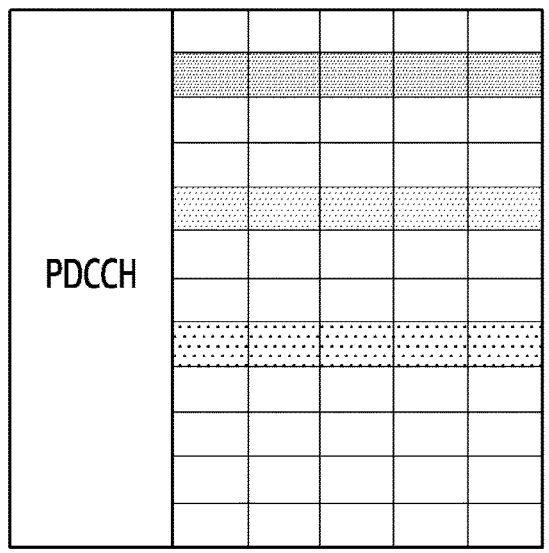
▨ PTRS for gNB 1 in frame transmitted by gNB 1
or ZP-PTRS in frames transmitted by g NB 2 and gNB 3
▨ PTRS for gNB 2 in frame transmitted by gNB 2
or ZP-PTRS in frames transmitted by g NB 1 and gNB 3
▨ PTRS for gNB 3 in frame transmitted by gNB 3
or ZP-PTRS in frames transmitted by g NB 1 and gNB 2

[Fig. 8D]
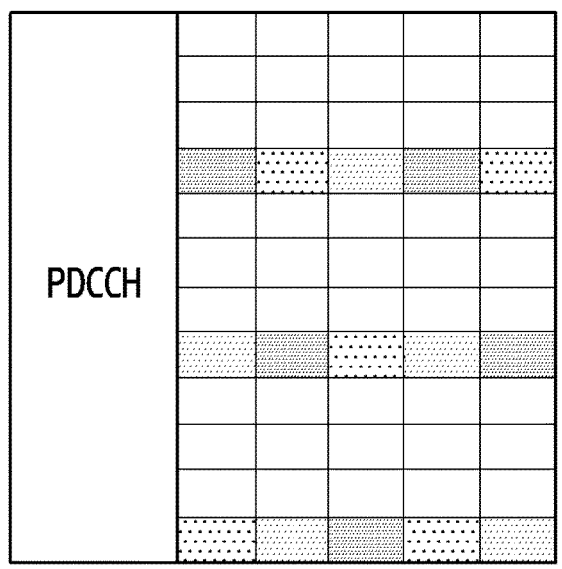
▨ PTRS for gNB 1 in frame transmitted by gNB 1
or ZP-PTRS in frames transmitted by g NB 2 and gNB 3
▨ PTRS for gNB 2 in frame transmitted by gNB 2
or ZP-PTRS in frames transmitted by g NB 1 and gNB 3
▨ PTRS for gNB 3 in frame transmitted by gNB 3
or ZP-PTRS in frames transmitted by g NB 1 and gNB 2

[Fig. 9]
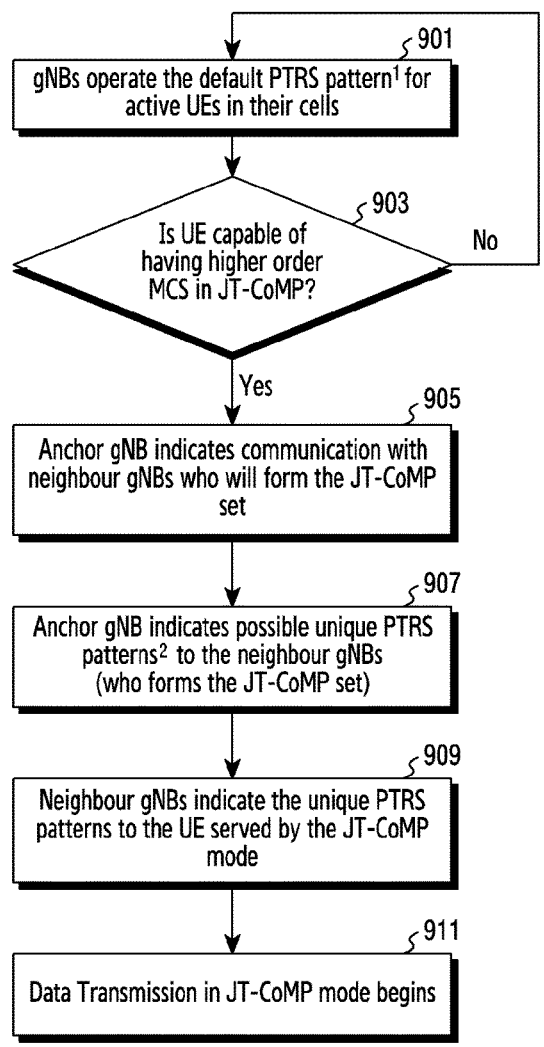

METHOD AND APPARATUS FOR PHASE TRACKING REFERENCE SIGNAL IN A WIRELESS COMMUNICATION SYSTEM

CROSS-REFERENCE TO RELATED APPLICATIONS

This application is a 371 of International Application No. PCT/KR2018/005170 filed on May 4, 2018, which claims priority to United Kingdom Patent Application No. 1707257.0 filed on May 5, 2017, the disclosures of which are herein incorporated by reference in their entirety.

BACKGROUND

1. Field

The present disclosure relates for a wireless communication, and more specifically to a method and apparatus for phase tracking reference signal in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In wireless communication systems, a phase mismatch between transmitter and receiver side oscillators, which may be referred to as Phase Noise (PN), results in a rotation of the constellation, potentially resulting in a reduction of transmission reliability (e.g. an increase in Bit Error Rate (BER)). In some systems, the most significant component of PN is rotation of the constellation by a common offset angle, which may be referred to as Common Phase Error (CPE). The problem of PN is typically greater for higher frequency communications, and can be a significant problem for millimetre (mm) wave communications (e.g. communication frequencies of approximately 6 GHz and above).

It is an aim of certain exemplary embodiments of the present invention to address, solve and/or mitigate, at least partly, at least one of the problems and/or disadvantages associated with the related art, for example at least one of the problems and/or disadvantages described above. It is an aim of certain exemplary embodiments of the present invention to provide at least one advantage over the related art, for example at least one of the advantages described below.

SUMMARY

According to various embodiments of the present disclosure, a method, for a first base station, for providing a Phase Tracking Reference Signal (PTRS) in a wireless communication system comprising the first base station, M−1 (M≥2) second base stations, and a mobile device, wherein the first and second base stations cooperate to jointly support the mobile device is provided. The method comprises: identifying M mutually exclusive sets of frequency resources; mapping at least a portion of PTRS information for the first base station to a first set of the frequency resources; mapping a zero-power PTRS to the other M−1 sets of frequency resources or leaving the other M−1 sets of frequency resources empty; and transmitting a signal comprising the PTRS information according to the frequency resource mapping.

According to various embodiments of the present disclosure, a method, for a mobile device, for providing a Phase Tracking Reference Signal (PTRS) in a wireless communication system comprising at least a first base station and a second base station, and the mobile device, wherein the first and second base stations cooperate to jointly support the mobile device is provided. The method comprises: receiving a signal from each of the first and second base stations; identifying at least two mutually exclusive sets of frequency resources; de-mapping at least a portion of PTRS information for the first base station from a first set of the frequency resources; and de-mapping at least a portion of PTRS information for the second base station from a second set of the frequency resources.

According to various embodiments of the present disclosure, an apparatus, for a first base station, for providing a Phase Tracking Reference Signal (PTRS) in a wireless communication system comprising the first base station, M−1 (M≥2) second base stations, and a mobile device, wherein the first and second base stations cooperate to jointly support the mobile device is provided. The apparatus comprises: a transceiver; and at least one processor coupled to the transceiver, and configured to: identify M mutually exclusive sets of frequency resources; map at least a portion of PTRS information for the first base station to a first set of the frequency resources; map a zero-power PTRS to the other M−1 sets of frequency resources or leaving the other M−1 sets of frequency resources empty; and transmit a signal comprising the PTRS information according to the frequency resource mapping.

According to various embodiments of the present disclosure, an apparatus, for a mobile device, for providing a Phase Tracking Reference Signal (PTRS) in a wireless communication system comprising at least a first base station and a second base station, and the mobile device, wherein the first and second base stations cooperate to jointly support the mobile device is provided. The apparatus comprises: a transceiver; and at least one processor coupled to the transceiver, and configured to: receive a signal from each of the first and second base stations; identify at least two mutually exclusive sets of frequency resources; de-map at least a portion of PTRS information for the first base station from a first set of the frequency resources; and de-map at least a portion of PTRS information for the second base station from a second set of the frequency resources.

The present invention is defined in the independent claims. Advantageous features are defined in the dependent claims.

Other aspects, advantages, and salient features of the invention will become apparent to those skilled in the art from the following detailed description, which, taken in conjunction with the annexed drawings, disclose exemplary embodiments of the invention.

BRIEF DESCRIPTION OF THE DRAWINGS

The above and other aspects, and features and advantages of certain exemplary embodiments and aspects of the present invention will be more apparent from the following detailed description when taken in conjunction with the accompanying drawings, in which:

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 is a flow diagram of an exemplary method for a base station according to various embodiments of the present disclosure;

FIG. 5 is a flow diagram of an exemplary method for a mobile station according to various embodiments of the present disclosure;

FIG. 6 illustrates an exemplary scenario in which two base stations may co-operate to jointly support a single mobile device in an exemplary embodiment;

FIGS. 7A and 7B illustrate an exemplary frame structure for transmitting information in an exemplary embodiment;

FIGS. 8A-8D illustrate various exemplary PTRS patterns; and

FIG. 9 is a flow diagram of an exemplary method for allowing multiple base stations to provide respective reference signals to a mobile device in an exemplary embodiment.

DETAILED DESCRIPTION

The following description of exemplary embodiments of the present invention, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the embodiments described herein can be made without departing from the scope of the invention.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present invention.

The terms and words used herein are not limited to the bibliographical or standard meanings, but, are merely used to enable a clear and consistent understanding of the invention.

Throughout the description and claims of this specification, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/or groups thereof described or disclosed in conjunction with a particular aspect, embodiment, example or claim of the present invention are to be understood to be applicable to any other aspect, embodiment, example or claim described herein unless incompatible therewith.

In wireless communication systems, a phase mismatch between transmitter and receiver side oscillators, which may be referred to as Phase Noise (PN), results in a rotation of the constellation, potentially resulting in a reduction of transmission reliability (e.g. an increase in Bit Error Rate (BER)). In some systems, the most significant component of PN is rotation of the constellation by a common offset angle, which may be referred to as Common Phase Error (CPE). The problem of PN is typically greater for higher frequency communications, and can be a significant problem for millimetre (mm) wave communications (e.g. communication frequencies of approximately 6 GHz and above).

In order to deal with the effects of PN, some systems may transmit a reference signal (e.g. a Phase Tracking Reference Signal (PTRS)) between the transmitter side and the receiver side. The PTRS can be used to compensate for the effects of PN, if necessary. For example, a base station (e.g. a gNB in 3GPP 5G NR) may transmit a reference signal (e.g. a PTRS) to a mobile device (e.g. a User Equipment (UE)) in one or more allocated symbols (e.g. one or more Resource Elements (RE) in each Physical Resource Block (PRB)).

In some systems, a technique may be applied in which two or more base stations co-operate to jointly support a single user. For example, in 3GPP Co-ordinated Multi-Point (CoMP), multiple neighbouring base stations (e.g. gNB in 3GPP 5G NR) co-ordinate with each other to jointly provide radio resources to a specific UE. In CoMP, a mode known as Joint Transmission (JT) requires the base stations to simultaneously support a single user.

In systems in which multiple base stations co-operate to jointly support a single user (e.g. JT-CoMP), two or more base stations may sometimes be required to transmit respective PTRSs to the same UE. In previous work (e.g. 3GPP RAN1 contribution R1-1705354), it was demonstrated that having wide-beam lower-power common PTRS transmission may be beneficial. However, if multiple wide-beam PTRSs are transmitted by respective base stations using the same transmission resources (e.g. time and frequency resources), a collision of the PTRSs may occur at the receiving UE. In this case, it may not be possible for the UE to properly detect or decode the respective PTRSs.

Accordingly, what is desired is a technique for providing multiple PTRSs in a manner that allows the multiple PTRSs to be properly detected.

The above information is presented as background information only to assist with an understanding of the present disclosure. No determination has been made, and no assertion is made, as to whether any of the above might be applicable as prior art with regard to the present invention.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for Phase Tracking Reference Signal in a wireless communication system.

The terms referring to Phase Tracking Reference Signal, the terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "mobile device", "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software. The BS may corresponds to base stations 601a, 601b of following FIG. 6. The BS may communicates with a terminal, or a mobile station, or a mobile device 603 of FIG. 6.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above. The wireless communication interface 210 may be provided in any suitable configuration, for example as one or more transmitters (or an array thereof) and one or more receivers (or an array thereof) provided separately, or as one or more transceivers (or an array thereof).

In some embodiments, the wireless communication interface 210 may be configured for transmitting PTRS to one or more mobile devices 603, for example as described above. The wireless communication interface 210 may be configured for transmitting signals according to mm-wave communications, for example as described above. The wireless communication interface 210 may be configured for transmitting a wide beam signal, for example as described above. The wireless communication interface 210 may be configured for transmitting a narrow beam signal, for example as described above. The wireless communication interface 210 may be configured for transmitting signals according to one or more modulation schemes, for example as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

The controller 240 may be configured for executing, performing and/or controlling various operations, processes and/or method step, for example some or all the operations described above in relation to the base station 110, 601*a*, 601*b*, required for operation of the base station 110, 601*a*, 601*b* according to any embodiment, aspect, example and/or claim disclosed herein. The controller 240 may comprise one or more modules for performing respective operations. For example, the controller 240 may comprise a identifying module for identifying M mutually exclusive sets of frequency resources, and a mapper module for mapping various pieces of information (e.g. PTRS and ZP-PTRS) to resource elements (e.g. to certain sets of frequency resources) of a frame to be transmitted. The skilled person will appreciate that in certain embodiments a single module may be provided to perform multiple operations.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software. The terminal 120 may corresponds to a terminal, or a mobile station, or a mobile device 603 of following FIG. 6. The terminal may communicates with a terminal, or a mobile station, or a base stations 601*a*, 601*b* of FIG. 6.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the communication interface 310 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

In some embodiments, the communication interface 310 may be configured for receiving PTRS from base stations 601*a*, 601*b*, for example as described above. The communication interface 310 may be configured for receiving signals according to mm-wave communications, for example as described above. The communication interface 310 may be configured for receiving a wide beam signal, for example as described above. The communication interface 310 may be configured for receiving a narrow beam signal, for example as described above. The communication interface 310 may be configured for receiving signals according to one or more modulation schemes, for example as described above. The communication interface 310 may be provided in any suitable configuration, for example as one or more receivers (or an array thereof) and one or more transmitters (or an array thereof) provided separately, or as one or more transceivers (or an array thereof).

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

The controller 330 may be configured for executing, performing and/or controlling various operations, processes and/or method steps, for example some or all the operations described above in relation to a mobile device 120, 603, required for operation of the mobile device 120, 603 according to any embodiment, aspect, example and/or claim disclosed herein. The controller 330 may comprise one or more modules for performing respective operations. For example, the controller 330 may comprise an identifying module for identifying M mutually exclusive sets of frequency resources, and a de-mapper module for de-mapping various pieces of information (e.g. PTRS) from resource elements (e.g. from certain sets of frequency resources) of a received frame. The skilled person will appreciate that in certain embodiments a single module may be provided to perform multiple operations.

Certain embodiments of the present invention provide methods, apparatus and systems for providing a Phase Tracking Reference Signal (PTRS) for tracking a phase mismatch between transmitter and receiver side oscillators in a wireless communication system. For example, certain embodiments provide methods, apparatus and systems for providing a PTRS in millimetre wave communications in 3rd Generation Partnership Project (3GPP) 5th Generation (5G) New Radio (NR). Certain embodiments provide methods, apparatus and systems for providing a PTRS in the case of Joint Transmission (JT) Co-ordinated Multi-Point (CoMP).

Certain embodiments of the present invention provide methods, apparatus and systems for providing a Phase Tracking Reference Signal (PTRS) for tracking a phase mismatch between transmitter and receiver side oscillators in a wireless communication system. For example, certain embodiments provide methods, apparatus and systems for providing a PTRS in mm-wave communications in 3GPP 5G NR. Certain embodiments provide methods, apparatus and systems for providing a PTRS in the case of Joint Transmission (JT) Co-ordinated Multi-Point (CoMP). However, the skilled person will appreciate that the present invention is not limited to these examples, and may be applied in any suitable system or standard, for example one or more existing and/or future generation wireless communication systems or standards.

As mentioned above, PN rotates the constellations of data symbols, which can result in a reduction of reception reliability. The problem of PN becomes significant for mm-wave communications. Accordingly, certain embodiments of the present invention provide a technique for providing a PTRS when using mm-wave communications.

In addition, PN becomes significant when using a relatively high-order modulation scheme, for example 64-Quadrature Amplitude Modulation (64-QAM) and higher, due to the relatively high density of the constellation points compared to lower-order modulation schemes. On the other hand, PN may not be detrimental to communications when using a relatively low-order modulation scheme, for example 16-QAM, due to the relatively low density of the constellation points. Accordingly, certain embodiments of the present invention provide a technique in which a PTRS may be provided for mobile devices (e.g. UE) that use a relatively high-order modulation scheme, for example 64-QAM and higher. On the other hand, certain embodiments may not need to provide a PTRS for those mobile devices that use a relatively low-order modulation scheme, for example below 64-QAM.

As mentioned above, the largest component of PN is typically Common Phase Error (CPE), which rotates the constellation by a common offset. Accordingly, in certain embodiments of the present invention, the PTRS may be provided for compensating for the effects of CPE.

As also mentioned above, in systems in which multiple base stations co-operate to jointly support a single user (e.g. 3GPP JT-CoMP), two or more base stations may sometimes be required to transmit respective PTRSs to the same UE. Accordingly, certain embodiments of the present invention provide a technique for allowing multiple base stations (e.g. gNB in 3GPP 5G NR) to provide respective PTRSs to a mobile device (e.g. a UE) while avoiding collision of the PTRSs at the mobile device, for example in scenarios in which each base station communicates with the mobile device using a relatively high-order modulation scheme.

FIG. 4 is a flow diagram of an exemplary method for a base station according to various embodiments of the present disclosure.

According to various embodiments of the present disclosure, a method, for a first base station, for providing a Phase Tracking Reference Signal (PTRS) in a wireless communication system comprising the first base station, M−1 (M≥2) second base stations, and a mobile device, wherein the first and second base stations cooperate to jointly support the mobile device is provided. In some embodiments, the base stations operate according to Joint Transmission (JT) Co-ordinated Multi-Point (CoMP).

In step 401, the first base station may identify M mutually exclusive sets of frequency resources. In some embodiments, the frequency resources comprise frequency resources in a Physical Downlink Shared Channel (PDSCH) part of a frame. In some embodiments, the frequency resources comprise one or more sub-carriers of one or more multi-carrier symbols (e.g. OFDM symbols).

In step 403, the first base station may map at least a portion of PTRS information for the first base station to a first set of the frequency resources. In some embodiments, the frequency resources of different sets comprise mutually exclusive sets of sub-carriers.

In step 405, the first base station may map a zero-power PTRS to the other M−1 sets of frequency resources or leaving the other M−1 sets of frequency resources empty. In some embodiments, the frequency resources of an ith set (i=1, 2, ..., M) comprise a subcarrier with subcarrier index M(i), wherein M is a function satisfying M(a)≠M(b) if a≠b.

In step 407, the first base station may transmit a signal comprising the PTRS information according to the frequency resource mapping. In some embodiments, the frequency resources of each set comprise the same set of subcarriers across two or more multi-carrier symbols (e.g. each OFDM symbol in a PDSCH part of a frame). In some embodiments, the PTRS information is transmitted using a wide-beam transmission. In some embodiments, the M sets of frequency resources are defined by one or more PTRS patterns. In some embodiments, the PTRS patterns comprise at least one of a symbol-level PTRS pattern, a multi-symbol-level PTRS pattern, a frame-level PTRS pattern, and a multi-frame-level PTRS pattern. In some embodiments, each one of the M base stations maps corresponding PTRS information to a respective set of frequency resources.

In some embodiments, the method further comprises mapping information to frequency resources not belonging to any of the M sets. In some embodiments, the method further comprises transmitting data to the mobile device using a narrow beam transmission.

In some embodiments, a system comprising two or more base stations, each base station configured to implement above method may be provided.

In some embodiments, a computer program comprising instructions which, when executed by a controller or a processor, cause the controller or processor to implement the above method may be provided. Also, in some embodiments, a computer readable storage medium storing a computer program according to the above method may be provided.

In some embodiments, a method for providing a Phase Tracking Reference Signal (PTRS) in a wireless communication system comprising at least a first base station and a second base station, and a mobile device, wherein the first and second base stations cooperate to jointly support the mobile device is provided. The method comprising: identifying at least two mutually exclusive sets of frequency resources; mapping, by the first base station, at least a portion of PTRS information of the first base station to a first set of the frequency resources; mapping, by the first base station, a zero-power PTRS to a second set of the frequency resources, or leaving, by the first base station, the second set of frequency resources empty; transmitting, by the first base station, a signal comprising the PTRS information of the first base station according to the frequency resource mapping; mapping, by the second base station, at least a portion of PTRS information of the second base station to the second set of the frequency resources; mapping, by the second base station, a zero-power PTRS to the first set of the frequency resources, or leaving, by the second base station, the first set of frequency resources empty; and transmitting, by the second base station, a signal comprising the PTRS information of the second base station according to the frequency resource mapping.

FIG. 5 is a flow diagram of an exemplary method for a mobile station according to various embodiments of the present disclosure.

According to various embodiments of the present disclosure, a method, for a mobile device, for providing a Phase Tracking Reference Signal (PTRS) in a wireless communication system comprising at least a first base station and a second base station, and the mobile device, wherein the first and second base stations cooperate to jointly support the mobile device is provided.

In step 501, the mobile device may receive a signal from each of the first and second base stations. In some embodiments, the base stations operate according to Joint Transmission (JT) Co-ordinated Multi-Point (CoMP). In some embodiments, the frequency resources comprise frequency resources in a Physical Downlink Shared Channel (PDSCH) part of a frame.

In step 503, the mobile device may identify at least two mutually exclusive sets of frequency resources. In some embodiments, the frequency resources comprise one or more sub-carriers of one or more multi-carrier symbols (e.g. OFDM symbols). In some embodiments, the frequency resources of different sets comprise mutually exclusive sets of sub-carriers. In some embodiments, the frequency resources of an ith set (i=1, 2, ..., M) comprise a subcarrier with subcarrier index M(i), wherein M is a function satisfying M(a)≠M(b) if a≠b. In some embodiments, the frequency resources of each set comprise the same set of subcarriers across two or more multi-carrier symbols (e.g. each OFDM symbol in a PDSCH part of a frame). In some embodiments, the M sets of frequency resources are defined by one or more PTRS patterns.

In step 505, the mobile device may de-map at least a portion of PTRS information for the first base station from a first set of the frequency resources. In some embodiments, the PTRS information is transmitted using a wide-beam transmission. In some embodiments, the frequency resources of different sets comprise mutually exclusive sets of sub-carriers.

In step 507, the mobile device may de-map at least a portion of PTRS information for the second base station from a second set of the frequency resources. In some embodiments, the frequency resources of an ith set (i=1, 2, ..., M) comprise a subcarrier with subcarrier index M(i), wherein M is a function satisfying M(a)≠M(b) if a≠b. In some embodiments, the frequency resources of each set comprise the same set of subcarriers across two or more multi-carrier symbols (e.g. each OFDM symbol in a PDSCH part of a frame). In some embodiments, the M sets of frequency resources are defined by one or more PTRS patterns. In some embodiments, the PTRS patterns comprise at least one of a symbol-level PTRS pattern, a multi-symbol-level PTRS pattern, a frame-level PTRS pattern, and a multi-frame-level PTRS pattern.

In some embodiments, a system comprising a mobile station configured to implement above method may be provided.

In some embodiments, a computer program comprising instructions which, when executed by a controller or a processor, cause the controller or processor to implement the above method may be provided. Also, in some embodiments, a computer readable storage medium storing a computer program according to the above method may be provided.

FIG. 6 illustrates an exemplary scenario in which two base stations may co-operate to jointly support a single mobile device in an exemplary embodiment. Specifically, FIG. 6 illustrates an exemplary scenario in which a first base station 601a (e.g. a gNB, labelled as gNB-A in FIG. 6) and a second base station 601b (e.g. a gNB, labelled as gNB-B in FIG. 6) cooperate to jointly support a mobile device 603 (e.g. a UE, labelled as UEk in FIG. 6). For example, the base stations cooperate to provide the mobile device 603 with a wireless communication service for communicating with other entities (e.g. other mobile devices). In this example, JT-CoMP is applied, although the skilled person will appreciate that any other suitable equivalent technique may be used. A set of base stations that cooperate to implement the JT-CoMP scheme (e.g. gNB-A 601a and gNB-B 601b) may be referred to as a CoMP set.

The coverage area (or cell) of each base station 601a, 601b may comprise one or more sectors. If there is only one sector, then that sector corresponds to the cell. In the example illustrated in FIG. 6, the coverage area of each base station 601a, 601b is divided into multiple sectors, one of which is illustrated 605a, 605b for each base station 601a, 601b.

As discussed further below, each base station 601a, 601b may transmit signals to the mobile device 603 using a wide-beam transmission or a narrow-beam transmission. For example, as illustrated in FIG. 6, each base station 601a, 601b may transmit PTRS to all mobile devices 603 in a corresponding cell or sector using a wide-beam transmission. A base station 601a, 601b may also transmit other control information (e.g. information normally transmitted in a Physical Downlink Control Channel (PDCCH)) to all mobile devices 603 in a corresponding cell or sector using a wide-beam transmission. As illustrated in FIG. 6, each base station 601a, 601b may transmit other information (e.g. information normally transmitted in a Physical Downlink Shared Channel (PDSCH)), for example data, directed to specific mobile device 603, using a narrow-beam transmission.

If a mobile device (e.g. UEk603) is located relatively close to a base station (e.g. gNB-A 601a or gNB-B 601b), the mobile device receive signal strength for a given base station transmission power will be greater than that of a mobile device 603 located relatively far from the base station 601a, 601b, due to the distance dependant increase in the path loss suffered by transmissions from the base station 601a, 601b. For example, a mobile device 603 located near to the outer edge of a sector or cell of a base station 601a, 601b will typically experience a relatively low Signal to Noise Ratio (SNR). Such a mobile device may be referred to as an edge UE, edge user, cell (or sector) edge UE or cell (or sector) edge user.

Mobile devices 603 located relatively close to a base station 601a, 601b may apply a modulation and coding scheme (MCS) for data transmission using a relatively high-order modulation scheme, for example 64-QAM and above (e.g. 64-QAM, 256-QAM or 1024-QAM). High-order modulation schemes provide a relatively high data rate but are less robust when the receive signal strength is low. Mobile devices 603 using a relatively high-order modulation scheme for data transmission may be referred to as high-order (or higher-order) MCS devices.

On the other hand, mobile devices 603 located relatively far from a base station 601a, 601b may apply an MCS for data transmission using a relatively low-order modulation scheme, for example below 64-QAM (e.g. 16-QAM and QPSK). This is because low-order modulation schemes are relatively robust when the receive signal strength is relatively low, but provide a relatively low data rate. Mobile devices 603 using a relatively low-order modulation scheme for data transmission may be referred to as low-order (or lower-order) MCS devices.

JT-CoMP is typically applied in scenarios in which a mobile device 603 is located within the coverage areas of two or more base stations 601a, 601b, but that is located relatively far from any one base station 601a, 601b. For example, JT-CoMP may sometimes be applied to cell edge UEs. FIG. 6 illustrates one example of such a scenario. By applying JT-CoMP in these scenarios, communication reliability and performance (e.g. Quality of Experience (QoE)) may be improved.

Due to their relative remoteness from the base stations 601a, 601b, mobile devices 603 to which JT-CoMP is applied (e.g. cell edge UEs) are typically low-order MCS devices, and hence do not require PTRS. However, in some scenarios, JT-CoMP may be applied to high-order MCS device that may require PTRS. For example, such scenarios may arise due to unplanned deployment of base stations, peculiar propagation conditions (e.g. street canyons etc.), nomadic/moving base stations, high-rise base stations providing targeted coverage, etc. For example, the street canyon effect may elongate the coverage of a particular base station.

When JT-CoMP is applied to high-order MCS devices, each base station 601a, 601b cooperating in the JT-CoMP scheme (i.e. the CoMP set) may be required to transmit a respective PTRS to the mobile device 603. However, in this case, if the base stations 601a, 601b forming the CoMP set transmit their respective PTRSs using the same time-frequency resources (e.g. PRBs), reception collisions in the PTRSs will occur at the mobile device 603, in which case the mobile device 603 may be unable to detect and/or decode the PTRSs.

Certain embodiments provide a technique in which reception collisions in PTRSs transmitted by multiple base stations may be avoided.

In certain exemplary embodiments, a millimetre wave transmission scheme may be applied. Millimetre wave transmissions typically suffer greater path loss, so to combat that and provide a higher SNR or Signal to Interference plus Noise Ratio (SINR), narrow beam transmissions targeting particular mobile devices (users) 603 may be used. However for common control channels to all mobile devices (users) 603 in a cell or sector, wide beam transmissions, even with a lower carrier frequency may be needed.

According to this scheme, signals may be transmitted from the base station 601a, 601b to mobile devices 603 through (i) a wide beam covering an entire cell or sector such that multiple mobile devices 603 (e.g. all mobile devices) within the cell or sector receive the wide beam signal, or (ii) a narrow beam that is directed towards a specific mobile device 603 within the cell or sector. Signals received by a mobile device 603 through a wide beam are typically received with a lower power (and hence a lower SINR) than signals received through a narrow beam.

In certain embodiments, PTRS symbols may be transmitted through a wide beam. For example, in certain embodiments, PTRS symbols may be transmitted through a wide beam, using PDSCH REs (for example, one or more REs usually assigned to PDSCH) as reference signals. In certain embodiments, the PTRS symbols may be transmitted with a lower power than control symbols transmitted through a wide beam PDCCH (for example, as described in co-pending UK patent application number 1704731.7). The PTRS symbols may be transmitted using a relatively low-order modulation scheme, for example Quadrature Phase Shift Keying (QPSK), that is capable of achieving sufficient reliability of reception of the PTRS symbols.

In the case of narrow beam transmission, spatial multiplexing techniques may be exploited to enable transmissions using the same resources (e.g. time and frequency resources). However, the use of wide beam transmission for transmitting the PTRS restricts the use of the spatial domain. Furthermore, if transmission of a PTRS is required in every symbol of a frame, this restricts the use of the time domain. Accordingly, certain embodiments of the present invention exploit the frequency domain to avoid reception collisions between PTRS transmissions from different base stations 601a, 601b.

In certain embodiments, each PTRS symbol transmitted by a base station 601a, 601b within a CoMP set is transmitted using a unique frequency resource (e.g. one or more sub-carriers). PTRS symbols transmitted by respective base stations 601a, 601b within a CoMP set may be mapped to frequency resources according to a specific pattern, which may be referred to as a PTRS pattern. This allows a mobile device 603 to differentiate the PTRS symbols received from each base station 601a, 601b.

FIGS. 7A and 7B illustrate an exemplary frame structure for transmitting information in an exemplary embodiment of the present invention. For example, the frame structure of FIGS. 7A and 7B may be used in the system illustrated in FIG. 6 for transmitting PTRS from multiple base stations to a mobile device while avoiding reception collisions of the PTRSs.

In the following example, it is assumed that the mobile device 603 is a high-order MCS device and is served by two base stations 601a, 601b operating in JT-CoMP mode. It is also assumed that each base station 601a, 601b transmits a respective PTRS to the mobile device 603 using a wide-beam transmission.

In the example illustrated in FIGS. 7A and 7B, the frame structure is used for certain Downlink (DL) Physical Layer channels, in particular a PDSCH and a PDCCH, for transmitting information (e.g. control signals and data) from a base station (e.g. gNB) to one or more mobile devices (e.g. UEs). In particular, the frame structure may be used to transmit PTRS. FIG. 7A illustrates the mapping of information to the frame structure for a first base station 601a (e.g. gNB-A illustrated in FIG. 6) and FIG. 7B illustrates the mapping of information to the frame structure for a second base station 601b (e.g. gNB-B illustrated in FIG. 6), where the first and second base stations belong to the same CoMP set. Accordingly, a signal according to the frame illustrated in FIG. 7A is transmitted by the first base station to the mobile device 603, and a signal according to the frame illustrated in FIG. 7B is transmitted by the second base station to the mobile device 603.

The frame comprises a number of Orthogonal Frequency Division Multiplexing (OFDM) symbols (7 symbols in the example illustrated in FIGS. 7A and 7B), each OFDM symbol comprising a number of subcarriers (12 subcarriers in the example illustrated in FIGS. 7A and 7B). Each subcarrier of each symbol may be referred to as a Resource Element (RE). The symbols may be thought of as forming a grid of REs with time along one axis of the grid (the horizontal axis in FIGS. 7A and 7B) and frequency along the other axis of the grid (the vertical axis in FIGS. 7A and 7B). The skilled person will appreciate that the present invention is not limited to OFDM symbols, and any suitable multi-carrier symbol may be used.

A block of REs comprising a number (e.g. 12) of adjacent subcarriers in a number (e.g. 7) of consecutive symbols may be defined as a Physical Resource Block (PRB). For example, the frame illustrated in FIGS. 7A and 7B may comprise a single 7×12 PRB.

The frame is divided into a number of consecutive symbols forming the PDCCH (two symbols in the example of FIGS. 7A and 7B) and a number of consecutive symbols forming the PDSCH (five symbols in the example of FIGS. 7A and 7B).

All subcarriers of each symbol forming the PDCCH part of the frame (i.e. all subcarriers of the first and second symbols in the example of FIGS. 7A and 7B) may be used to transmit control information. This control information may be mapped to the subcarriers of the PDCCH symbols using any suitable scheme. In certain embodiments, the control information transmitted in the PDCCH may be transmitted in a wide-beam transmission to all mobile devices 603 in a cell or sector.

At least a portion of PTRS information relating to the first base station 601a (gNB-A) is mapped to a first set of one or more subcarriers of a certain symbol forming the PDSCH part of the frame, and at least a portion of PTRS information relating to the second base station 601b (gNB-B) is mapped to a second set of one or more subcarriers of the same symbol forming the PDSCH part of the frame. The first set of subcarriers and the second set of subcarriers are mutually exclusive sets (i.e. none of the subcarriers within the first set belong to the second set, and none of the subcarriers within the second set belong to the first set). In the example illustrated in FIGS. 7A and 7B, PTRS information relating to the first base station 601a is mapped to a single subcarrier at subcarrier index n+1, and PTRS information relating to the second base station 601b is mapped to a single subcarrier at subcarrier index n.

Further PTRS information relating to the first and second base stations 601a, 601b may be mapped to other symbols forming the PDSCH part of the frame (e.g. all PDSCH symbols). In certain embodiments, the mapping used for each PDSCH symbol may be the same. For example, as illustrated in FIGS. 7A and 7B, PTRS information relating to the first base station is mapped to the same subcarrier (i.e. subcarrier n+1) for every PDSCH symbol, and PTRS information relating to the second base station is mapped to the same subcarrier (i.e. subcarrier n) for every PDSCH symbol. However, in other embodiments, the mapping applied to different PDSCH symbols may be different. In any event, for a given PDSCH symbol, the set of subcarriers to which PTRS information relating to the first base station is mapped, and the set of subcarriers to which PTRS information relating to the second base station is mapped should be mutually exclusive.

The pattern by which PTRS information relating to respective base stations 601a, 601b within a CoMP set is mapped to frequency resources (e.g. subcarriers) may be referred to as a PTRS pattern. Such a pattern may be defined at any suitable level of granularity. For example, a pattern defining the mapping at the level of a single PDSCH symbol (i.e. symbol-wise mapping) may be referred to as a symbol-level PTRS pattern, while a pattern defining the mapping at the level of a frame (i.e. a frame-wise mapping) may be referred to as a frame-level PTRS pattern. The skilled person will appreciate that the mapping may be applied according to a pattern in blocks of any suitable number of symbols. In the example illustrated in FIGS. 7A and 7B, the frame-level PTRS pattern comprises a repeat of the symbol-level PTRS pattern, and the PTRS pattern is the same for every frame. Furthermore, although the PTRS pattern described above is defined with reference to a single frame (e.g. where the frame-level PTRS pattern is repeated for different frames), the skilled person will appreciate that the PTRS pattern may be defined over two or more frames.

As mentioned above, the PTRS information may be transmitted through a wide-beam transmission to all mobile devices 603 in a cell or sector. Specifically, the first base station transmits a wide-beam signal according to the frame illustrated in FIG. 7A to the mobile device 603, and the second base station 601b transmits a wide-beam signal according to the frame illustrated in FIG. 7B to the mobile device 603. Since the first and second sets of subcarriers used to carry the PTRS information of respective base stations 601a, 601b are mutually exclusive, reception collision of the PTRS information at the mobile device 603 may be avoided.

In the example of FIGS. 7A and 7B, the first and second sets of subcarriers each comprise a single subcarrier. However, the skilled person will appreciate that the first set and/or the second set may comprise multiple subcarriers.

Furthermore, although FIGS. 7A and 7B illustrate the exemplary case in which the CoMP set comprises two base stations 601a, 601b, the skilled person will appreciate that the CoMP set may include more than two base stations. More generally, where there are M base stations within a CoMP set, M mutually exclusive sets of one or more subcarriers may be defined, and M items of PTRS information related to M respective base stations may be mapped to the M respective sets of subcarriers.

In cases where a PTRS pattern is defined with respect to a single symbol (i.e. at a single time index), a symbol-level mutual exclusivity condition may be defined in relation to M sets of one or more subcarriers, such that each subcarrier within any one of the M sets does not belong to any of the other M−1 sets. In cases where a PTRS pattern is defined with respect to multiple symbols (i.e. at multiple time indexes), an overall mutual exclusivity condition may be defined, such that the symbol-level mutual exclusivity condition is satisfied for each individual symbol (i.e. on a symbol-wise basis).

Any subcarriers of PDSCH symbols that do not belong to any of the M sets of subcarriers (e.g. in the example of FIGS. 7A and 7B, any subcarriers that are not the subcarrier with index n+1 (first set) or the subcarrier with index n (second set)) may be used to carry any suitable type of information (e.g. data). In certain embodiments, this information may be transmitted using a narrow-beam transmission directed to a particular mobile device 603, as illustrated in FIG. 6.

It is desirable to avoid reception collision at a mobile device 603 between a PTRS information received from a certain base station and any other transmission within the PDSCH symbols in a frame transmitted by another base station (e.g. PTRS information relating to another base station or information transmitted in a narrow-beam transmission by another base station). Accordingly, in each PDSCH symbol of a frame transmitted by a certain base station, BSx, all subcarriers belonging to any of the M sets of subcarriers, other than the set of subcarriers used to carry the PTRS information of the base station BSx, may be left empty or may be used to carry a Zero-Power (ZP) PTRS. For example, in the example illustrated in FIGS. 7A and 7B, subcarrier n+1 is used to carry PTRS for the first base station 601a and subcarrier n is used to carry PTRS for the second base station 601b. Accordingly, PTRS for the first base station 601a is mapped to subcarrier n+1 in the frame transmitted by the first base station 601a, and so ZP-PTRS is mapped to subcarrier n+1 in the frame transmitted by the second base station 601b. Conversely, PTRS for the second base station 601b is mapped to subcarrier n in the frame transmitted by the second base station 601b, and so ZP-PTRS is mapped to subcarrier n in the frame transmitted by the first base station 601a.

FIGS. 8A-8D illustrate various further exemplary PTRS patterns. The PTRS patterns illustrated in FIGS. 8A-8D may be used in the exemplary case that the CoMP set comprises three base stations. PTRS patterns for other numbers of base stations will readily occur to the skilled person.

FIG. 8A illustrates a case in which the sub-carriers allocated to respective base stations for transmitting PTRS are adjacent sub-carriers, and in which the PTRS pattern is the same for each symbol in PDSCH. FIG. 8B illustrates a case in which the sub-carriers allocated to respective base stations for transmitting PTRS are adjacent sub-carriers, and in which the PTRS pattern is different for different symbols in PDSCH. FIGS. 8C and 8D illustrate examples similar to FIGS. 8A and 8B respectively, except that the allocated sub-carriers are non-adjacent sub-carriers.

The PTRS patterns illustrated in FIGS. 8B and 8D may require synchronisation in the transmission of frames by different base stations within the CoMP set to ensure that the PDSCH part of the frame from different base stations are aligned to avoid PTRS collisions at a mobile device. On the other hand, such synchronisation may not be required in the examples of FIGS. 8A and 8C.

The PTRS patterns used in JT-CoMP may be configured among the base stations forming the CoMP set using any suitable scheme, and information signalling the PTRS pattern may be transmitted to each mobile device 603 to enable the mobile devices 603 to detect and decode the PTRS information.

A mobile device 603 receives signals from each base station 601a, 601b in the CoMP set, each signal containing PTRS information for a respective base station 601a, 601b. Upon receiving a signal transmitted by a particular base station 601a, 601b in the CoMP set, the mobile device 603 demodulates and decodes the signal to obtain the corresponding frame and extracts information contained therein. In particular the mobile device 603 may extract the PTRS information for the corresponding base station from the relevant subcarriers indicated by the signalled PTRS pattern information. The mobile device repeats this process for signals received from other base stations in the CoMP set to obtain corresponding PTRS information for those base stations. The mobile device 603 may then use the extracted pieces of PTRS information to compensate for PN in subsequent signals received from the corresponding base stations (e.g. data transmissions through a narrow-beam transmission using JT-CoMP).

FIG. 9 is a flow diagram of an exemplary method for allowing multiple base stations to provide respective reference signals to a mobile device in an exemplary embodiment. For example, the method of FIG. 9 may be applied using the system described in relation to FIG. 9 and the frame structure described in relation to FIGS. 7A and 7B.

In this embodiment, the system may operate in two modes. In a first mode, JT-CoMP is not applied with higher-order MCS for a given mobile device 603 (user), and each mobile device 603 may be supported by a default PTRS pattern (as described further below) from the CoMP base stations 601a, 601b. In a second mode, JT-CoMP is applied with higher-order MCS, and each mobile device 603 may be jointly supported by two or more base stations 601a, 601b, with one or more unique PTRS patterns (as described further below).

In the first mode, if a mobile device 603 requires PTRS information (e.g. if it is a high-order MCS device) from one base station (601a or 601b) only, the default PTRS pattern can still be used. Accordingly, in the first mode, M sets of one or more subcarriers used by M respective base stations to map PTRS information do not need to be mutually exclusive. For example, in certain embodiments, M sets of one or more subcarriers used by M respective base stations to map PTRS information may be the same set of subcarriers. In this case, PTRS information relating to each base station may be mapped to the same set of one or more subcarriers for all base stations 601a, 601b. The pattern used for mapping PTRS information in the first mode may be referred to as a default PTRS pattern.

In the first mode, each base station 601a, 601b may transmit its PTRS information through a wide-beam transmission to all mobile devices 603 in a corresponding cell or sector. Even though the PTRS is mapped to the same set of subcarriers for each base station 601a, 601b in the first mode, reception collision of PTRS information at a mobile device 603 does not occur because the mobile device 603 receives PTRS information from only one base station 601a, 601b at a time, as the relatively low power of PTRS ensures that the weaker signal PTRS transmission from the second base station 601b can be treated as interference by the mobile device 603.

In the second mode, if a mobile device 603 requires multiple PTRS information (e.g. if it is a high-order MCS device), the mobile device 603 will receive PTRS information from two or more base stations 601a, 107a (e.g. each base station 601a, 601b in the CoMP set). To avoid reception collisions of the PTRS information as the mobile device 603, in the second mode PTRS information relating to different base stations 601a, 601b may be mapped to M mutually exclusive sets of one or more subcarriers, for example in the manner described above. The pattern used for mapping PTRS information in the second mode may be referred to as a unique PTRS pattern.

In the second mode, each base station 601a, 601b may transmit its PTRS information through a wide-beam transmission to all mobile devices 603 in a cell or sector. Even though PTRS information is received by a mobile device 603 from two or more base stations 601a, 601b, reception collisions of the PTRS information at the mobile device 603 is avoided due to the mapping scheme used for mapping the PTRS information to the transmission frame.

In a first step 901, the system operates in the first mode such that all base stations 601a, 601b operate using the default PTRS pattern for active mobile devices 603 in their cells or sectors.

In a next step 903, it is determined whether a mobile device 603 is capable of operating as a high-order MCS device using JT-CoMP. If not, the method returns to step 901, otherwise the method proceeds to the next step 905. This determination may be made by any suitable entity, for example, the mobile device 603, the first base station 601a, the second base station 601b, or another entity.

In the next step 905, a first base station 601a initiates communicates with a second base station 601b, where the second base station 601b is a neighbouring base station to the first base station 601a, and the first and second base stations 601a, 601b will form the CoMP set. The particular base station that has supported the mobile device 603 in the first mode may be referred to as an anchor base station. In this example, the anchor base station is the first base station 601a.

In a next step 907, the anchor base station 601a indicates possible unique PTRS patterns to the neighbouring base station 601b.

In a next step 909, the neighbouring base station 601b indicates the unique PTRS pattern to the mobile device 603 served by the JT-CoMP mode.

In a next step 911, data transmission in the JT-CoMP mode begins.

Certain embodiments of the present invention may be provided in the form of a base station and/or method therefor. Certain embodiments of the present invention may be provided in the form of a mobile device and/or method therefor. Certain embodiments of the present invention may be provided in the form of a system comprising a plurality of base stations and a mobile device, and/or method therefor.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation of X may be performed by a module configured to perform X (or an X-module). The one or more elements may be implemented in the form of hardware, software, or any combination of hardware and software.

It will be appreciated that certain embodiments of the present invention may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain embodiments of the present invention. Accordingly, certain embodiments provide a program comprising code for implementing a method, apparatus or system as claimed in any one of the claims of this specification, and a machine-readable storage storing such a program. Still further, such programs may be conveyed electronically via any medium, for example a communication signal carried over a wired or wireless connection, and embodiments suitably encompass the same.

While the invention has been shown and described with reference to certain embodiments thereof, it will be understood by those skilled in the art that various changes in form and detail may be made therein without departing from the scope of the invention, as defined by the appended claims.

The invention claimed is:

1. A method, for a first base station, for providing a Phase Tracking Reference Signal (PTRS) in a wireless communication system comprising the first base station, M−1 second base stations, and a mobile device, wherein M≥2, and wherein the first base station and the M−1 second base stations cooperate to jointly support the mobile device, the method comprising:
  identifying M mutually exclusive sets of frequency resources, wherein each subcarrier within any one set of the M mutually exclusive sets does not belong to any other set of the M mutually exclusive sets;
  mapping at least a portion of PTRS information for the first base station to a first set of the M mutually exclusive sets of the frequency resources;
  mapping a zero-power PTRS to other M−1 mutually exclusive sets of the frequency resources or leaving the other M−1 mutually exclusive sets of the frequency resources empty, wherein PTRS information for the M−1 second base stations is mapped to the other M−1 mutually exclusive sets of the frequency resources; and transmitting a signal comprising the PTRS information according to the frequency resource mapping, wherein the PTRS information is transmitted using a wide beam with a lower power than PDCCH symbols transmitted using a wide beam, and wherein PDSCH symbols that do not belong to any set of the M mutually exclusive sets of frequency resources are transmitted to a particular mobile device using a narrow beam.

2. The method of claim 1, wherein the first base station and the M−1 second base stations operate according to Joint Transmission (JT) Co-ordinated Multi-Point (CoMP).

3. The method of claim 1, wherein the frequency resources comprise frequency resources in a Physical Downlink Shared Channel (PDSCH) part of a frame.

4. The method of claim 1, wherein the frequency resources comprise one or more sub-carriers of one or more multi-carrier symbols (e.g. OFDM symbols).

5. The method of claim 4, wherein frequency resources of different sets comprise mutually exclusive sets of sub-carriers.

6. The method of claim 4, wherein the frequency resources of an ith set (i=1, 2, . . . , M) comprise a subcarrier with subcarrier index M(i), wherein the M(i) is a function satisfying M(a)≠M(b) if a≠b.

7. A method, for a mobile device, for providing a Phase Tracking Reference Signal (PTRS) in a wireless communication system comprising at least a first base station and M−1 second base stations, and the mobile device, wherein M≥2, wherein the first base station and the M−1 second base stations cooperate to jointly support the mobile device, the method comprising:

receiving a signal from each of the first and second base stations;

identifying M mutually exclusive sets of frequency resources, wherein each subcarrier within any one of the M mutually exclusive sets does not belong to any other set of the M mutually exclusive sets;

de-mapping at least a portion of PTRS information for the first base station from a first set of the M mutually exclusive sets of the frequency resources, wherein PTRS information for the M−1 second base stations is mapped to other M−1 mutually exclusive sets of the frequency resources; and de-mapping at least a portion of PTRS information for the M−1 second base stations from the other M−1 mutually exclusive sets of the frequency resources, wherein the PTRS information is received using a wide beam with a lower power than PDCCH symbols received using a wide beam, and wherein PDSCH symbols that do not belong to any set of the M mutually exclusive sets of frequency resources are received using a narrow beam.

8. The method of claim 7, wherein the frequency resources comprise frequency resources in a Physical Downlink Shared Channel (PDSCH) part of a frame.

9. An apparatus, for a first base station, for providing a Phase Tracking Reference Signal (PTRS) in a wireless communication system comprising the first base station, M−1 second base stations, and a mobile device, wherein M≥2, and wherein the first base station and the M−1 second base stations cooperate to jointly support the mobile device, the apparatus comprising:

a transceiver; and at least one processor coupled to the transceiver, and configured to:

identify M mutually exclusive sets of frequency resources, each subcarrier within any one of the M mutually exclusive sets does not belong to any of other M−1 mutually exclusive sets;

map at least a portion of PTRS information for the first base station to a first set of the M mutually exclusive sets of the frequency resources;

map a zero-power PTRS to remaining M−1 mutually exclusive sets of the frequency resources or leaving the remaining M−1 mutually exclusive sets of the frequency resources empty, wherein PTRS information for the M−1 second base stations is mapped to the remaining M−1 mutually exclusive sets of the frequency resources, wherein the remaining M−1 mutually exclusive sets are M−1 mutually exclusive sets other than the first set among the M mutually exclusive sets; and transmit a signal comprising the PTRS information according to the frequency resource mapping, wherein the signal comprising the PTRS information is transmitted using a wide beam with a lower power than PDCCH symbols transmitted using a wide beam, and wherein subcarriers of PDSCH symbols that do not belong to any of the M mutually exclusive sets of frequency resources are transmitted to a particular mobile device using a narrow beam.

10. The apparatus of claim 9, wherein the first base station and the M−1 second base stations operate according to Joint Transmission (JT) Co-ordinated Multi-Point (CoMP).

11. The apparatus of claim 9, wherein the frequency resources comprise frequency resources in a Physical Downlink Shared Channel (PDSCH) part of a frame.

12. The apparatus of claim 9, wherein the frequency resources comprise one or more sub-carriers of one or more multi-carrier symbols (e.g. OFDM symbols).

13. The apparatus of claim 12, wherein frequency resources of different sets comprise mutually exclusive sets of sub-carriers.

14. An apparatus, for a mobile device, for providing a Phase Tracking Reference Signal (PTRS) in a wireless communication system comprising at least a first base station and M−1 second base stations, and the mobile device, wherein M≥2, wherein the first base station and the M−1 second base stations cooperate to jointly support the mobile device, the apparatus comprising:

a transceiver; and at least one processor coupled to the transceiver, and configured to:

receive a signal from each of the first and second base stations;

identify M mutually exclusive sets of frequency resources, each subcarrier within any one of the M mutually exclusive sets does not belong to any of other M−1 mutually exclusive sets;

de-map at least a portion of PTRS information for the first base station from a first set of the M mutually exclusive sets of the frequency resources, wherein PTRS information for the M−1 second base stations is mapped to remaining M−1 mutually exclusive sets of the frequency resources, wherein the remaining M−1 mutually exclusive sets are M−1 mutually exclusive sets other than the first set among the M mutually exclusive sets; and de-map at least a portion of PTRS information for the M−1 second base stations from the remaining M−1 sets of the frequency resources, wherein the signal comprising the PTRS information is received using a wide beam with a lower power than PDCCH symbols received using a wide beam, and wherein subcarriers of PDSCH symbols that do not belong to any of the M mutually exclusive sets of frequency resources are received using a narrow beam.

15. The apparatus of claim 14, wherein the frequency resources comprise frequency resources in a Physical Downlink Shared Channel (PDSCH) part of a frame.

* * * * *

UNITED STATES PATENT AND TRADEMARK OFFICE
CERTIFICATE OF CORRECTION

PATENT NO. : 11,552,754 B2
APPLICATION NO. : 16/611211
DATED : January 10, 2023
INVENTOR(S) : Mythri Hunukumbure et al.

It is certified that error appears in the above-identified patent and that said Letters Patent is hereby corrected as shown below:

On the Title Page

Item (30) Foreign Application Priority Data, delete "May 5, 2017 (GB) ........ 1707257" and replace with --May 5, 2017 (GB) ........ 1707257.0--.

Signed and Sealed this
Eighteenth Day of April, 2023

Katherine Kelly Vidal
*Director of the United States Patent and Trademark Office*